US011094198B2

(12) United States Patent
Fu

(10) Patent No.: US 11,094,198 B2
(45) Date of Patent: Aug. 17, 2021

(54) LANE DETERMINATION METHOD, DEVICE AND STORAGE MEDIUM

(71) Applicant: Tencent Technology (Shenzhen) Company Limited, Shenzhen (CN)

(72) Inventor: Yujin Fu, Shenzhen (CN)

(*) Notice: Subject to any disclaimer, the term of this patent is extended or adjusted under 35 U.S.C. 154(b) by 218 days.

(21) Appl. No.: 16/439,496

(22) Filed: Jun. 12, 2019

(65) Prior Publication Data

US 2019/0295420 A1 Sep. 26, 2019

Related U.S. Application Data

(63) Continuation of application No. PCT/CN2018/075052, filed on Feb. 2, 2018.

(30) Foreign Application Priority Data

Feb. 7, 2017 (CN) .......................... 201710073556.7

(51) Int. Cl.
*G08G 1/16* (2006.01)
*G06T 7/246* (2017.01)
(Continued)

(52) U.S. Cl.
CPC ............. *G08G 1/167* (2013.01); *G01C 21/30* (2013.01); *G01C 21/34* (2013.01); *G01S 19/33* (2013.01);
(Continued)

(58) Field of Classification Search
CPC ................... G08G 1/167; G06T 7/248; G06T 2207/30256; G01C 21/30; G01C 21/34;
(Continued)

(56) References Cited

U.S. PATENT DOCUMENTS 10,579,067 B2 * 3/2020 Rohani .................... G06K 9/46
10,871,377 B1 * 12/2020 Yu ........................... G01C 21/32
(Continued)

FOREIGN PATENT DOCUMENTS

CN     101339043 A    1/2009
CN     101346602 A    1/2009
(Continued)

OTHER PUBLICATIONS

Tencent Technology, ISRWO, PCT/CN2018/075052, dated Apr. 27, 2018, 5 pgs.
(Continued)

*Primary Examiner* — Mia M Thomas
(74) *Attorney, Agent, or Firm* — Morgan, Lewis & Bockius LLP

(57) ABSTRACT

This application discloses a lane determining method performed at a computing device. The computing device obtains image information of a road surface image collected by a vehicle; identifies first lane information of at least one first lane of the road surface from the image information, the first lane information including a location relationship between a travelling lane in which the vehicle is located in the road surface and the at least one first lane, and a feature of the first lane; performs feature matching between the feature of the at least one first lane and a feature of at least one second lane in a map in which the road surface is located, the feature of the at least one second lane obtained from the map; and determines a target lane of the vehicle in the map corresponding to the travelling lane in the map in accordance with the feature matching result.

18 Claims, 9 Drawing Sheets

(51) Int. Cl.
*G01C 21/30* (2006.01)
*G06K 9/00* (2006.01)
*G06K 9/46* (2006.01)
*G01S 19/45* (2010.01)
*G01C 21/34* (2006.01)
*G01S 19/33* (2010.01)

(52) U.S. Cl.
CPC .......... *G01S 19/45* (2013.01); *G06K 9/00798* (2013.01); *G06K 9/46* (2013.01); *G06T 7/248* (2017.01); *G06K 2209/21* (2013.01); *G06T 2207/30256* (2013.01)

(58) Field of Classification Search
CPC .. G06K 2209/21; G06K 9/46; G06K 9/00798; G01S 19/45; G01S 19/33
See application file for complete search history.

(56) References Cited

U.S. PATENT DOCUMENTS

| | | | |
|---|---|---|---|
| 2006/0233424 | A1 | 10/2006 | Miyajima et al. |
| 2008/0240513 | A1* | 10/2008 | Xie ................... G06K 9/00791 382/113 |
| 2010/0121569 | A1* | 5/2010 | Nakamura ......... G01C 21/3658 701/532 |
| 2010/0169013 | A1* | 7/2010 | Nakamura ........... G08G 1/0969 701/469 |
| 2014/0005932 | A1* | 1/2014 | Kozak ................. G01C 21/005 701/446 |
| 2015/0278633 | A1* | 10/2015 | Yeh .................... G06K 9/00791 382/103 |
| 2017/0066459 | A1* | 3/2017 | Singh .................... B61L 23/045 |
| 2017/0243067 | A1* | 8/2017 | Bulan ................ G06K 9/00832 |
| 2018/0101178 | A1* | 4/2018 | Yoon ................... G05D 1/0253 |
| 2018/0307917 | A1* | 10/2018 | Mittal .................. B60W 30/10 |
| 2019/0027032 | A1* | 1/2019 | Arunachalam ...... G08G 1/0965 |

FOREIGN PATENT DOCUMENTS

| | | |
|---|---|---|
| CN | 103954275 A | 7/2014 |
| CN | 105260713 A | 1/2016 |
| CN | 105608429 A | 5/2016 |
| CN | 105679079 A | 6/2016 |
| CN | 106352867 A | 1/2017 |
| JP | 2008197905 A | 8/2008 |
| JP | 2009162518 A | 7/2009 |
| JP | 2009176189 A | 8/2009 |
| KR | 101209062 B1 | 12/2012 |
| KR | 20140021826 A | 2/2014 |

OTHER PUBLICATIONS

Tencent Technology, IPRP, PCT/CN2018/075052, dated Aug. 13, 2019, 4 pgs.

* cited by examiner

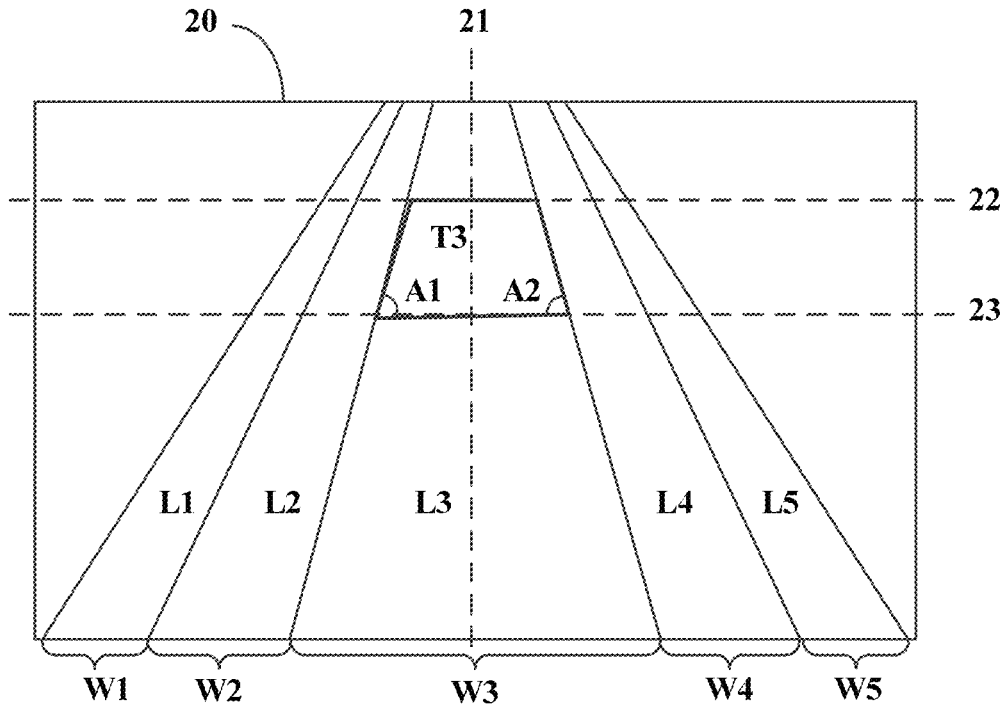

FIG. 2b

Identify, from image information of a travelling road surface collected from a vehicle, a first lane line feature of a first lane in the travelling road surface, and a location relationship between a travelling lane and a first lane line — S301

Obtain a second lane line feature of a road on which a geographic location of the vehicle is located from a map — S302

Determine a target lane corresponding to the travelling lane in the map by using the second lane line feature, the first lane line feature, and the location relationship — S303

FIG. 3

LANE DETERMINATION METHOD, DEVICE AND STORAGE MEDIUM

CROSS-REFERENCE TO RELATED APPLICATIONS

This application is a continuation application of PCT/CN2018/075052, entitled "LANE DETERMINING METHOD AND APPARATUS, AND STORAGE MEDIUM" filed on Feb. 2, 2018, which claims priority to Chinese Patent Application No. 201710073556.7, entitled "TARGET LANE DETERMINING METHOD AND APPARATUS" filed on Feb. 7, 2017, all of which are incorporated by reference in their entireties.

FIELD OF THE TECHNOLOGY

This application relates to a positioning technology, and specifically, to a lane determining method and apparatus, and a storage medium.

BACKGROUND OF THE DISCLOSURE

With advances of technologies, electronic maps and vehicle navigation technologies have generally been applied to life of people. Self-driving technologies are also on the rise. Among these technologies, vehicle positioning is a basic and inevitable technology. In a current vehicle positioning method, a vehicle is positioned mainly in dependence on a satellite or an in-vehicle sensor.

SUMMARY

According to a first aspect of this application, a lane determining method is performed at a computing device. The method includes: obtaining image information of a road surface image collected by the vehicle; identifying first lane information of at least one first lane of the road surface from the image information, the first lane information including a location relationship used to indicate a travelling lane in which the vehicle is located in the road surface and the at least one first lane, and a feature of the at least one first lane; performing feature matching between the feature of the at least one first lane and a feature of at least one second lane in a map in which the road surface is located, the feature of the at least one second lane being obtained from the map; and determining a target lane of the vehicle in the map, the target lane being a lane corresponding to the travelling lane in the map in accordance with the feature matching result.

According to a second aspect of this application, a computing device is further provided. The computing device includes: one or more processors and memory, computer readable instructions stored in the memory. The computer readable instructions, when executed by the one or more processors, cause the computing device to perform the aforementioned lane determining method.

According to a third aspect of this application, a non-transitory computer readable storage medium is further provided. The non-transitory computer readable storage medium stores a plurality of machine readable instructions in connection with a computing device having one or more processors, wherein the plurality of machine readable instructions, when executed by the one or more processors, cause the computing device to perform the aforementioned lane determining method.

BRIEF DESCRIPTION OF THE DRAWINGS

Accompanying drawings described herein are used to provide further understanding about the embodiments of this application, and constitute one portion of the embodiments of this application; and schematic embodiments of this application and their description are used to explain this application, and do not constitute an inappropriate limit on this application. In the figures:

FIG. 2b is a schematic diagram of a lane determining method according to an embodiment of this application.

FIG. 3 is a flowchart of a lane determining method according to an embodiment of this application.

DESCRIPTION OF EMBODIMENTS

Figure 1A:
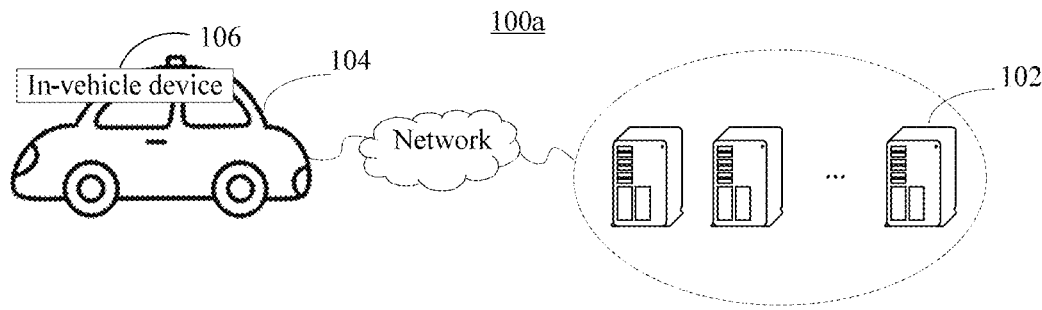
FIG. 1a is a schematic diagram of an implementation environment according to an embodiment of this application.

The described embodiments are only some embodiments rather than all the embodiments of this application. FIG. 1a is a schematic diagram of an implementation environment according to an embodiment of this application. As shown in FIG. 1a, a server 102 may be connected to an in-vehicle device (which is also referred to as a terminal device) in an automobile 104 through a network. The foregoing network may include but is not limited to: a wide area network, a metropolitan area network, a local area network, or the like. The terminal device 106 may include, but is not limited to, various in-vehicle terminals, for example, a PC, a mobile phone, a tablet computer, a driving recorder, and an in-vehicle navigator.

A method according to an embodiment of this application may be performed by the server 102, may be performed by the terminal device 106 in the automobile 104, or may be performed by the server 102 and the terminal device 106 jointly. The method according to this embodiment of this application performed by the terminal 106 may alternatively be performed by a client installed on the terminal.

Figure 1B:
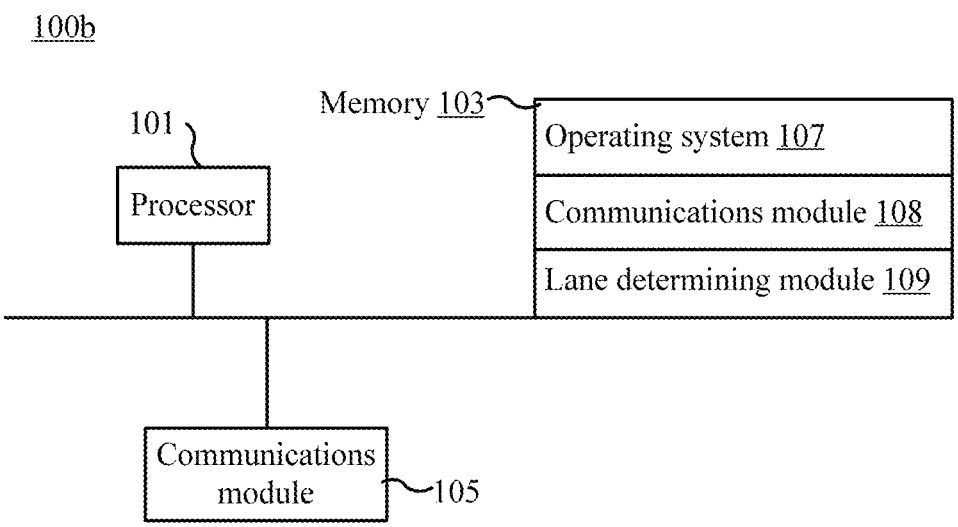
FIG. 1b is a structural diagram of hardware of a computing device according to an embodiment of this application.

FIG. 1b is a structural diagram of a computing device according to an embodiment of this application. The computing device 100*b* may be the terminal device 106 in the implementation environment 100*a* shown in FIG. 1*a*, or may be the server 102.

Referring to FIG. 1*b*, the computing device 100*b* may include one or more of the following components: a processor 101, a memory 103, and a communications module 105.

The computing device 100*b* may communicate with another device through a network by using the communications module 105.

The processor 101 may include one or more processors, may include a single-core or a multi-core processor, may be in the same physical device, or may be distributed in a plurality of physical devices. The processor 101 may be used for execution.

The memory 103 may include an operating system 107, a communications module 108, and a lane determining module 109. The lane determining module 109 may include computer readable instructions. These computer readable instructions may cause the processor 101 to perform a lane determining method according to the embodiments of this application.

Figure 2A:
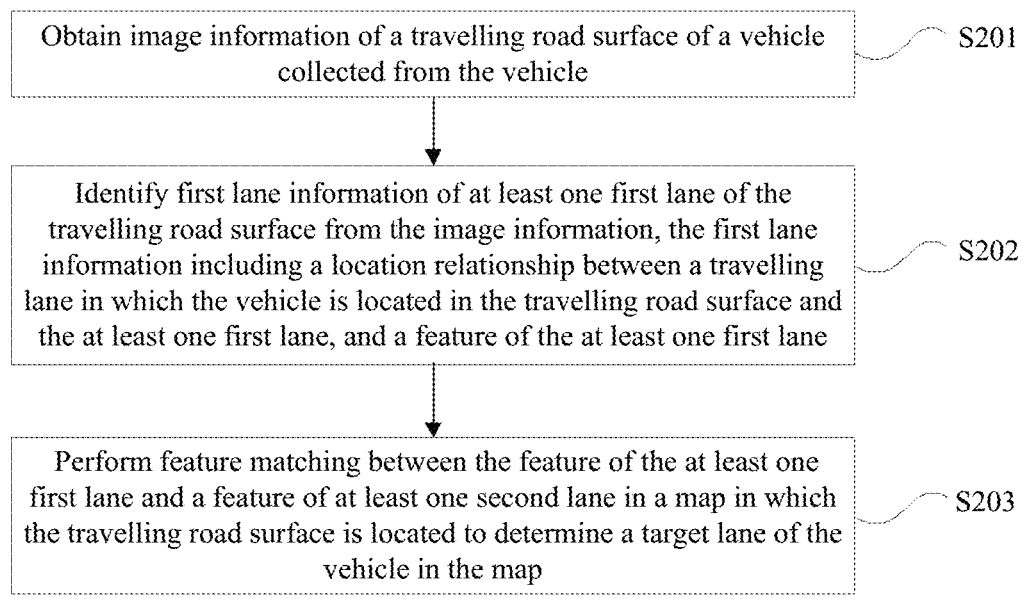
FIG. 2a is a flowchart of a lane determining method according to an embodiment of this application.

FIG. 2*a* is a flowchart of a lane determining method according to an embodiment of this application. As shown in FIG. 2*a*, the method may include the following steps:

S201: Obtain image information of a road surface of a vehicle collected by the vehicle.

In some embodiments, an image collection device may be installed on a vehicle, so that the image collection device collects image information of a road surface of the vehicle. The image information may include a picture and a video. The image collection device may include a camera, a thermal imager, and the like.

For example, the image collection device may be installed in front of or behind the vehicle. For example, the image collection device may be installed on a middle location on a front windscreen or a rear windscreen, to cause the camera to be parallel to a road surface as much as possible and cause an optical axis to point to a direction right in front of or right behind travelling. In this way, a vanishing point of a road is close to the center of a video image, and lanes on two sides of the vehicle may fall within the video image.

S202: Identify first lane information of at least one first lane of the road surface from the image information, the first lane information including a location relationship between a travelling lane in which the vehicle is located in the road surface and the at least one first lane, and a feature of the at least one first lane.

In some embodiments, a travelling lane of the vehicle may be determined in the image information, and then the location relationship is determined according to the determined travelling lane and the feature of the first lane. Herein, the travelling lane of the vehicle is a lane in which the vehicle is located in the road surface, and the first lane is a lane identified from the image information. The location relationship is a location relationship between the travelling lane and the first lane. When the first lane does not include the travelling lane, the location relationship may be: the travelling lane is on the left side or right side of the first lane, or is a second lane located on the left side out of the first lane. When the first lane includes the travelling lane, the location relationship may be: the travelling lane is a second lane of the first lane from the left. In some embodiments, the location relationship between the travelling lane and the first lane may alternatively indicate a location relationship between the travelling lane and a lane of the first lane. For example, the location relationship may be: the travelling lane is a lane sandwiched by a left second lane and a left third lane of six lanes of the first lane.

In some embodiments, when the travelling lane is determined in the image information, a lane on which a centerline of an image in the image information is located may be determined as the travelling lane. For example, as shown in FIG. 2*b*, a centerline 21 of an image 20 is collected along a lane extension direction, and a lane L3 on which the centerline is located is determined as the travelling lane.

In some embodiments, a lane having a maximum lane width in the image information may be determined as the travelling lane. For example, as shown in FIG. 2*b*, the travelling lane of the vehicle may be determined according to widths W1, W2, W3, W4, and W5 of lanes L1, L2, L3, L4, and L5 on a side in the image close to the vehicle, that is, the width W3 of the lane L3 is maximum. Therefore, the lane L3 may be determined as the travelling lane.

In some embodiments, the travelling lane may be determined according to a shape of a lane in the image information. For example, as shown in FIG. 2*b*, two parallel auxiliary lines 22 and 23 may be drawn in the image 20 along a direction perpendicular to the lane extension direction, to obtain trapezoids corresponding to lanes. Among these trapezoids, the lane L3 corresponding to a trapezoid T3 having two base angles on one auxiliary line that are both acute angles (as angles A1 and A2 shown in FIG. 2*b*) is used as the travelling lane. For another example, two parallel lines 22 and 23 perpendicular to the lane extension direction may be drawn, and a lane sandwiched by two neighboring lanes forming a trapezoid having a maximum area with the two parallel lines may be determined as the travelling lane. The area of the trapezoid T3 in FIG. 2*b* is maximum, and therefore the lane L3 may be determined as the travelling lane.

In some embodiments, the travelling lane may be determined according to an angle between lanes in the image information. For example, a plurality of lanes may be identified in the image, and a lane defined by two neighboring lanes having opposite inclined directions is determined as the travelling lane. For another example, a lane defined by two neighboring lanes between which an angle is maximum may be determined as the travelling lane.

S203: Perform feature matching between the feature of the at least one first lane and a feature of at least one second lane in a map in which the road surface is located to determine a target lane of the vehicle in the map.

The target lane is a lane corresponding to the travelling lane in the map, and the at least one second lane and the feature of the at least one second lane are obtained from the map.

Based on the method according to the embodiments, feature matching is performed between the lane information extracted from the image collected by the vehicle and the lane information of the geographic location obtained in the map, thereby determining the target lane corresponding to the travelling lane of the vehicle in the map, and therefore positioning on the vehicle can be accurate to a lane. The lane information of the vehicle is quite useful in technologies such as vehicle navigation and autonomous driving, and can help improve accuracy of navigation, improve safety of autonomous driving, and so on.

In the embodiments, various features of the first lane, for example, a lane feature, a lane width, an identifier sprayed on a road surface, a transportation sign, and a speed limiting identifier may be extracted from the image to perform lane identification. Solutions of the embodiments are described below by using an example in which a feature of a lane serves as a lane feature, implementation methods in which other lane features are used are similar, and details are not described herein one by one again. FIG. 3 is a flowchart of a lane determining method according to an embodiment of this application. As shown in FIG. 3, the method may include the following steps:

S301: Identify, from image information of a road surface collected from a vehicle, a first lane feature of a first lane in the road surface, and a location relationship between a travelling lane and a first lane. The first lane feature may include a feature of one or more first lanes.

S302: Obtain a second lane feature of a road on which a geographic location of the vehicle is located from a map. The second lane feature may include a feature of one or more second lanes.

S303: Determine a target lane corresponding to the travelling lane in the map by using the second lane feature, the first lane feature, and the location relationship.

In the embodiments, feature matching is performed by using the feature of the lane identified from the image and the feature of the lane of the corresponding road surface in the map, thereby determining the target lane corresponding to the travelling lane of the vehicle in the map, and therefore a calculation amount required for determining the lane may be reduced.

Figures 4A, 4B:
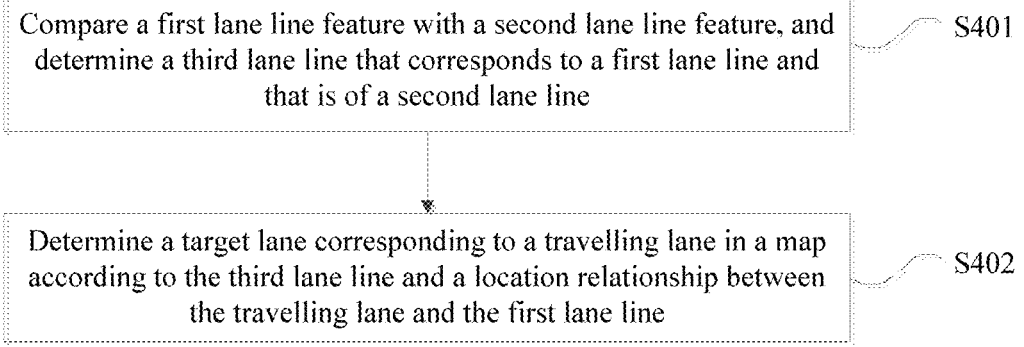
FIG. 4a is a flowchart of a lane determining method according to an embodiment of this application.
FIG. 4b is a schematic diagram of a lane determining method according to an embodiment of this application.

In the embodiments, there may be many methods for determining the target lane by using the lane feature in S303, and several examples are listed below. FIG. 4a is a flowchart of a lane determining method according to an embodiment of this application. As shown in FIG. 4a, the method may include the following steps:

S401: Compare a first lane feature with a second lane feature, and determine a third lane that corresponds to a first lane and that is of a second lane.

S402: Determine a target lane corresponding to a travelling lane in a map according to the third lane and a location relationship between the travelling lane and the first lane.

In some embodiments, when the first lane feature includes a line type of one first lane, and the second lane feature includes a line type of the one or more second lanes, a lane that is of the line type of the first lane and that is of the one or more second lanes may be used as the third lane; and the target lane corresponding to the travelling lane in the map is determined according to the third lane and the location relationship.

In the embodiments, line types of lanes may include a solid line, a dashed line, a double solid line, a straight line, a curve, and the like.

For example, when only one lane whose line type is a dashed line is identified from the image information, it is identified from the image information that the location relationship between the travelling lane of the vehicle and the lane is: the travelling lane is located on the left of the lane. Three lanes of the road are obtained from the map, and are of line types that are respectively a solid line, a dashed line, and a solid line. A lane being a dashed line of the foregoing three lanes may be used as a lane in the map corresponding to the first lane identified in the image, that is, the third lane. It is determined, according to the third lane and the foregoing location relationship, that a lane on the left of the third lane in the map is the target lane.

In some embodiments, when the first lane feature includes line types and an arrangement manner of a plurality of first lanes, and the second lane feature includes line types and an arrangement manner of a plurality of second lanes, a plurality of lanes that is of the line types and the arrangement manner of the plurality of first lanes and that is of the plurality of second lanes may be used as the third lanes. The target lane corresponding to the travelling lane in the map is determined according to the determined third lane and the location relationship.

For example, the plurality of first lanes is identified from the image information collected by a camera, the line types and the arrangement manner of the first lane feature are a solid line, a dashed line, a dashed line, and a dashed line, and it is identified from the image information that the location relationship between the vehicle and the four first lanes is: the vehicle is located in the middle of the four first lanes, that is, lanes corresponding to first two line types are two lanes on the left of the vehicle, and lanes corresponding to last two line types are two lanes on the right of the vehicle. Moreover, the map provides second lanes being one road possessing five lanes, also that is, six second lanes, and a second lane feature of the second lanes is a solid line, a dashed line, a dashed line, a dashed line, a dashed line, and a solid line. Therefore, lanes, of the foregoing six second lanes, having the first lane feature of such line types and an arrangement manner as a solid line, a dashed line, a dashed line, and a dashed line may be used as third lanes, that is, the first to four lanes are used the third lanes. It may be determined, according to the determined third lanes and the foregoing location relationship, that the vehicle is located in the middle of the third lanes, that is, located on the right of the second lane or on the left of the third lane. Therefore, it may be determined that the target lane is a left second lane in the map.

In some examples, a line type of a lane may be indicated by using a symbol, and an arrangement manner of a plurality of lanes may be indicated by using a symbol string. For example, symbols corresponding to the line types of the first lanes may be organized in the arrangement manner of the first lanes according to a preset correspondence between a line type and a symbol, and a first symbol string indicating the first lane feature is generated; symbols corresponding to the line types of the second lanes are organized in the arrangement manner of the second lanes according to the correspondence, and a second symbol string indicating the second lane feature is generated; the first symbol string is compared with the second symbol string, and a plurality of lanes corresponding to a plurality of symbols in the second symbol string that is the same as those in the first symbol string is used as the third lanes; and the target lane corresponding to the travelling lane in the map is determined according to the third lane and the location relationship. For example, as shown in FIG. 4b, line types and an arrangement manner of four first lanes J1, J2, J3, and J4 identified from the image information are {J1 solid line, J2 dashed line, J3 dashed line, J4 dashed line}. When a dashed line is indicated by using 0, and a solid line is indicated by using 1, it may be learned that the first symbol string indicating the first lane feature is "1000". Similarly, six second lanes K1, K2, K3, K4, K5, and K6 are obtained from the map, line types and an arrangement manner are {K1 solid line, K2 dashed line, K3 dashed line, K4 dashed line, K5 dashed line, K6 solid line}, and it may be learned that the second symbol string indicating the second lane feature is "100001". The first symbol string "1000" is compared with the second symbol string "100001", and it may be determined that first four symbols in the second symbol string "100001" match the first symbol string "1000". Therefore, it may be determined that four lanes K1, K2, K3, and K4 corresponding to the first four symbols in the second symbol string are third lanes corresponding to the first lanes J1, J2, J3, and J4 in the map. Then, it may be determined, according to the location relationship between the travelling lane and the first lane identified from the image being that the travelling lane is between the left second and third lanes, that a lane of the third lanes that is between the left second and third lanes is the target lane, that is, a lane between K2 and K3 is the target lane.

Figures 4C, 4D:
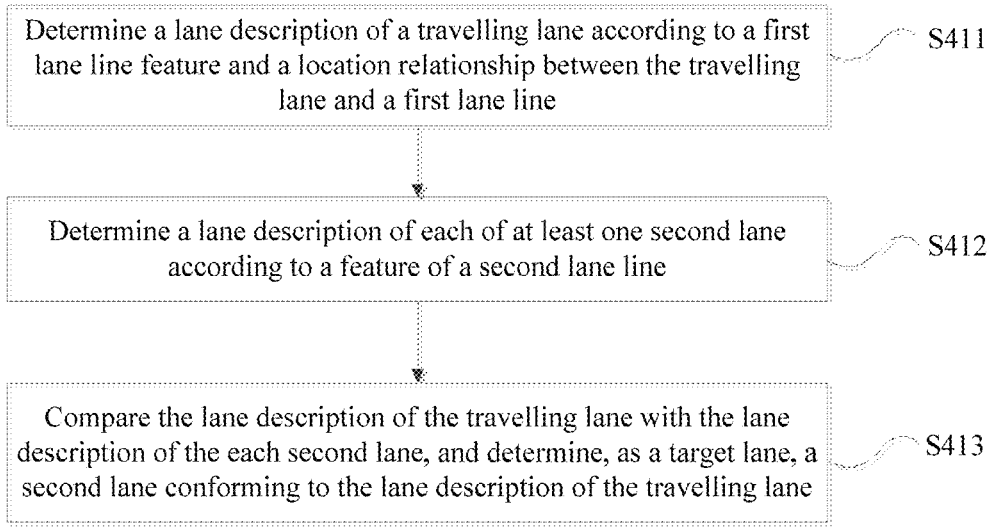
FIG. 4c is a flowchart of a lane determining method according to an embodiment of this application.
FIG. 4d is a schematic diagram of a lane determining method according to an embodiment of this application.

FIG. 4c is a flowchart of a lane determining method according to an embodiment of this application. As shown in FIG. 4c, the method may include the following steps:

S411: Determine a lane description of a travelling lane according to a first lane feature and a location relationship between the travelling lane and a first lane.

S412: Determine a lane description of each of at least one second lane according to a feature of a second lane.

Herein, a lane description of one lane may include a feature of one or more lanes and a location relationship between the one or more lanes and the lane.

S413: Compare the lane description of the travelling lane with the lane description of the each second lane, and determine, as a target lane, a second lane conforming to the lane description of the travelling lane.

In some embodiments, when the lane description of the travelling lane includes a line type of one first lane and a location relationship between the first lane and the travelling lane, the lane description of the each second lane is determined. The lane description of the each second lane may include a line type of one second lane and a location relationship between the second lane and the second lane. A lane of the at least one second lane, where a line type and a location relationship in a lane description of the lane are consistent with the line type and the location relationship in the lane description of the travelling lane may be determined as the target lane. For example, when only one first lane is identified from the image information, a line type of the first lane is a dashed line, and the location relationship between the first lane and the travelling lane being that the travelling lane is located on the left of the first lane is identified from the image information, it may be determined that the lane description of the travelling lane is, for example, "dashed left". If three second lanes are obtained from the map, and line types and an arrangement manner of the second lanes are a solid line, a dashed line, and a solid line, it may be determined that in two second lanes A and B defined by the three second lanes, the lane description of the lane A is "solid left, dashed right", and the lane description of the lane B is "dashed left, solid right". The lane description of the travelling lane is compared with the lane description of each of the lane A and the lane B, and it may be determined that the lane description of the lane B of the second lanes is consistent with the feature of the travelling lane. Therefore, it is determined that the lane B is the target lane corresponding to the travelling lane in the map.

In some embodiments, when the lane description of the travelling lane includes line types of a plurality of first lanes, the first arrangement manner, and a location relationship between the plurality of first lanes and the travelling lane, the lane description of the each second lane is determined. The lane description of the each second lane includes line types of a plurality of second lanes, a second arrangement manner, and a location relationship between the plurality of second lanes and the second lane. A lane of the at least one second lane, where a line type, an arrangement manner, and a location relationship in a lane description of the lane are consistent with the line type, the first arrangement manner, and the location relationship in the lane description of the travelling lane is determined as the target lane. For example, when four first lanes are identified from the image information, line types and an arrangement manner of the four first lanes are {solid line, dashed line, dashed line, dashed line}, and the travelling lane is located between two middle lanes of the four the first lane, it may be therefore determined that the lane description of the travelling lane may be, for example, "solid line, dashed line, travelling lane, dashed line, dashed line". Six second lanes and five second lanes defined by the six second lanes are obtained from the map, and line types and an arrangement manner of the six second lanes are {solid line, dashed line, dashed line, dashed line, dashed line, solid line}. It may be determined that lane descriptions of the five second lane are respectively a lane A {solid line, lane A, dashed line, dashed line, dashed line, dashed line, solid line}, a lane B {solid line, dashed line, lane B, dashed line, dashed line, dashed line, solid line}, a lane C {solid line, dashed line, dashed line, lane C, dashed line, dashed line, solid line}, a lane D {solid line, dashed line, dashed line, dashed line, lane D, dashed line, solid line}, and a lane E {solid line, dashed line, dashed line, dashed line, dashed line, lane E, solid line}. It may be determined through comparison that the lane description of the lane B conforms to the lane description of the travelling lane, and therefore it may be determined that the lane B is the target lane corresponding to the travelling lane in the map.

In some embodiments, symbols corresponding to first lanes in the lane description of the travelling lane may be organized according to a preset correspondence between a line type and a location relationship and a symbol in the first arrangement manner, and a first symbol string indicating the lane description of the travelling lane is generated; symbols corresponding to the plurality of second lanes in lane descriptions of second lanes are organized according to the correspondence in the second arrangement manner, and second symbol strings indicating the lane descriptions of the second lanes are generated; and the first symbol string is compared with each of the second symbol strings of the second lanes, and a second lane corresponding to a second symbol string conforming to the first symbol string is determined as the target lane. For example, as shown in FIG. 4d, line types and an arrangement manner of four first lanes J1, J2, J3, and J4 identified from the image information are {J1 solid line, J2 dashed line, J3 dashed line, J4 dashed line}, and the location relationship between the travelling lane L0 and the first lanes is that the travelling lane is between the lanes J2 and J3. When a dashed line is indicated by using 0, a solid line is indicated by using 1, and a lane is indicated by using Q, it may be learned that the first symbol string indicating the lane description of the travelling lane is "10Q00". Similarly, six second lanes K1, K2, K3, K4, K5, and K6 are obtained from the map, line types and an arrangement manner are {K1 solid line, K2 dashed line, K3 dashed line, K4 dashed line, K5 dashed line, K6 solid line}, and it may be learned that the second symbol strings of the lane descriptions of the five second lanes are respectively L1: "1Q00001", L2: "10Q0001", L3: "100Q001", L4: "1000Q01", and L5: "10000Q1". The first symbol string is compared with the second symbol strings, and it may be determined that the symbol string "10Q0001" of the lane L2 conforms to the first symbol string "10Q00" of the travelling lane L0. Therefore, it may be determined that L2 is the target lane corresponding to the travelling lane L0 in the map.

In some embodiments, the second lane or the second lane obtained from the map may be a lane or a lane that is obtained from the map according to a travelling direction of the vehicle and that is in a direction consistent with the travelling direction of the vehicle.

Figure 5A:
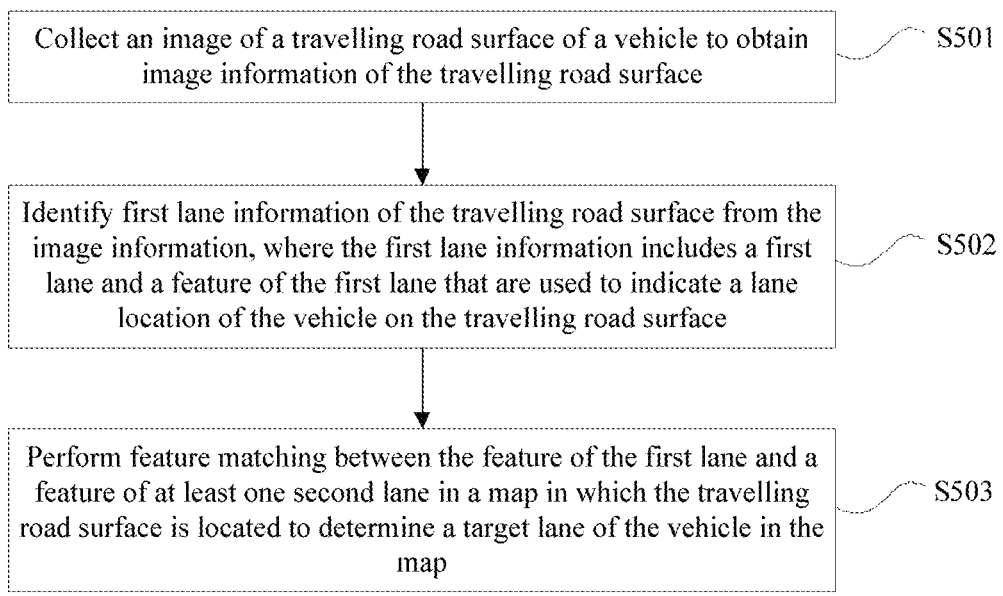
FIG. 5a is a flowchart of a lane determining method according to an embodiment of this application.

FIG. 5a is a flowchart of an optional lane determining method according to an embodiment of this application. As shown in FIG. 5a, the method may include the following steps:

Step S501: Collect an image of a road surface of a vehicle to obtain image information of the road surface.

Step S502: Identify first lane information of the road surface from the image information, where the first lane information includes a first lane and a feature of the first lane that are used to indicate a lane location of the vehicle on the road surface.

Step S503: Perform feature matching between the feature of the first lane and a feature of at least one second lane in a map in which the road surface is located to determine a target lane of the vehicle in the map, where the at least one second lane and the feature of the at least one second lane are obtained from the map, and the at least one second lane includes the target lane.

By performing step S501 to step S503, image processing is performed on the image information of the road surface to identify the first lane information, and then feature matching is performed between the feature of the first lane and the feature of the at least one second lane in the map in which the road surface is located to determine the target lane of the vehicle in the map. By using only existing devices of a current autonomous driving vehicle, the vehicle may be transversely positioned, to determine a lane on which the vehicle is actually located, and a technical problem of relatively high investment costs may be resolved when the vehicle is precisely positioned, thereby achieving technical effects of precisely positioning the vehicle and reducing the costs.

The foregoing road surface is a road surface on which the vehicle is currently travelling. The foregoing image information is an image having features of the road surface, for example, a color picture or a black and white picture, a color video or a black and white video, or a thermal imaging picture. The foregoing features include a lane feature, a lane width, a lane type, a road identifier, a transportation sign, a speed limiting identifier, and the like, and the lane features include at least a dashed line, a solid line, a straight line, a curve, and the like. The lane types may include an expressway, a national road, and the like. The foregoing vehicle may be an autonomous driving vehicle, a self-driving vehicle, various motor vehicles, and the like.

The first lane indicated by the foregoing first lane information may be a lane on which the vehicle is actually travelling, or may be any lane having a relative location relationship with a lane on which the vehicle is actually travelling.

The foregoing method of this embodiment of this application is mainly used to transversely position a vehicle, and includes but is not limited to being used to transversely position an autonomous driving vehicle.

It should be noted that, the vehicle may step on a line (that is, a lane). Therefore, for convenience of description, in this embodiment of this application, when the vehicle steps on a line, as long as the width of the vehicle reaches 50% of that of a lane, it may be considered that the vehicle is located in the lane.

Since the automobile industry occurs, self-driving automobiles are always one of hot projects strongly challenged by automobile industry elites of nations. Because a self-driving automobile has an infinite application prospect in a dangerous operating environment or even in military application, investments from national governments are also attracted. However, because of problems of computer calculation capability and control system design, each current autonomous driving vehicle is limited to being used in a closed site or for a particular objective. With development of technologies, in recent years, numerous automobile corporations begin to happen to coincide with presentation of an autonomous driving technology, and even some automobile manufacturers predict that this technology may be popularized by 2020.

For the self-driving automobile, whether positioning is accurate directly affects travelling safety. Each related technical solution is a complete positioning solution for positioning a self-driving automobile, includes both transverse positioning and longitudinal positioning, and implicitly includes GPS/BDS application. The technical solution of this embodiment of this application concentrates on transverse positioning of a self-driving automobile, weakens description related to the GPS/BDS application, and is an auxiliary means for GPS/BDS positioning when GPS/BDS positioning precision is not high. For the self-driving automobile, transverse positioning of the vehicle is more basic and important than longitudinal positioning, particularly in a vehicle travelling process. The reason is that the self-driving automobile is travelling according to a path planned on a high-precision map in advance, and the path needs to be precise to at least a lane level. As long as the vehicle has not encountered an emergency or an intersection, the vehicle may be always travelling along the path. Therefore, in the longitudinal travelling direction, even if the vehicle pulls ahead a bit or lags behind a bit relative to an actual location of the vehicle, impact on the self-driving automobile is not large, but precise location information needs to be provided to the vehicle in the transverse direction. Only if the vehicle knows a specific location of a lane on which the vehicle is currently located, the vehicle can make a decision and plan a next travelling action. By using the technical solution of this embodiment of this application, the vehicle may be precisely positioned on the transverse location. This embodiment of this application is described in detail below with reference to FIG. 2.

In the technical solution provided in step S501, when image collection is performed on the road surface of the vehicle to obtain the image information of the road surface, a picture or a video of the road surface of the vehicle may be collected by using an in-vehicle camera; and a thermal imaging picture of the road surface of the vehicle may be further collected by using an in-vehicle thermal imager.

For example, a camera for detecting a lane may be installed in front of the vehicle, and usually installed on a middle location on a front windscreen, to cause the camera to be parallel to a road surface as much as possible and cause an optical axis to point to a direction right in front of travelling. In this way, a vanishing point of a road is close to the center of a video image, and lanes on two sides of the vehicle may fall within the video image. Preferably, a selected equivalent focal length of the camera should not be excessively large, so as to ensure a sufficient viewing angle for photographing lanes on two sides of the vehicle.

It should be noted that, once an image collection apparatus (for example, a camera) is installed and fixed on the vehicle, a collection area of the collection apparatus is determined, that is, a lane location of the vehicle in the collection area is relatively fixed. For example, for the foregoing camera installed on the center right in front of the vehicle, if a collection width of the camera is five lanes, a lane on which a middle location of the collection width is located is a lane on which the vehicle is located.

In the technical solution provided in step S502, when the first lane information of the road surface is identified from the image information, orthographic projection processing may be performed on the image information; a feature is extracted from the image information subjected to the orthographic projection processing; and inverse perspective projection processing is performed on the feature-extracted image information.

Figure 5B:
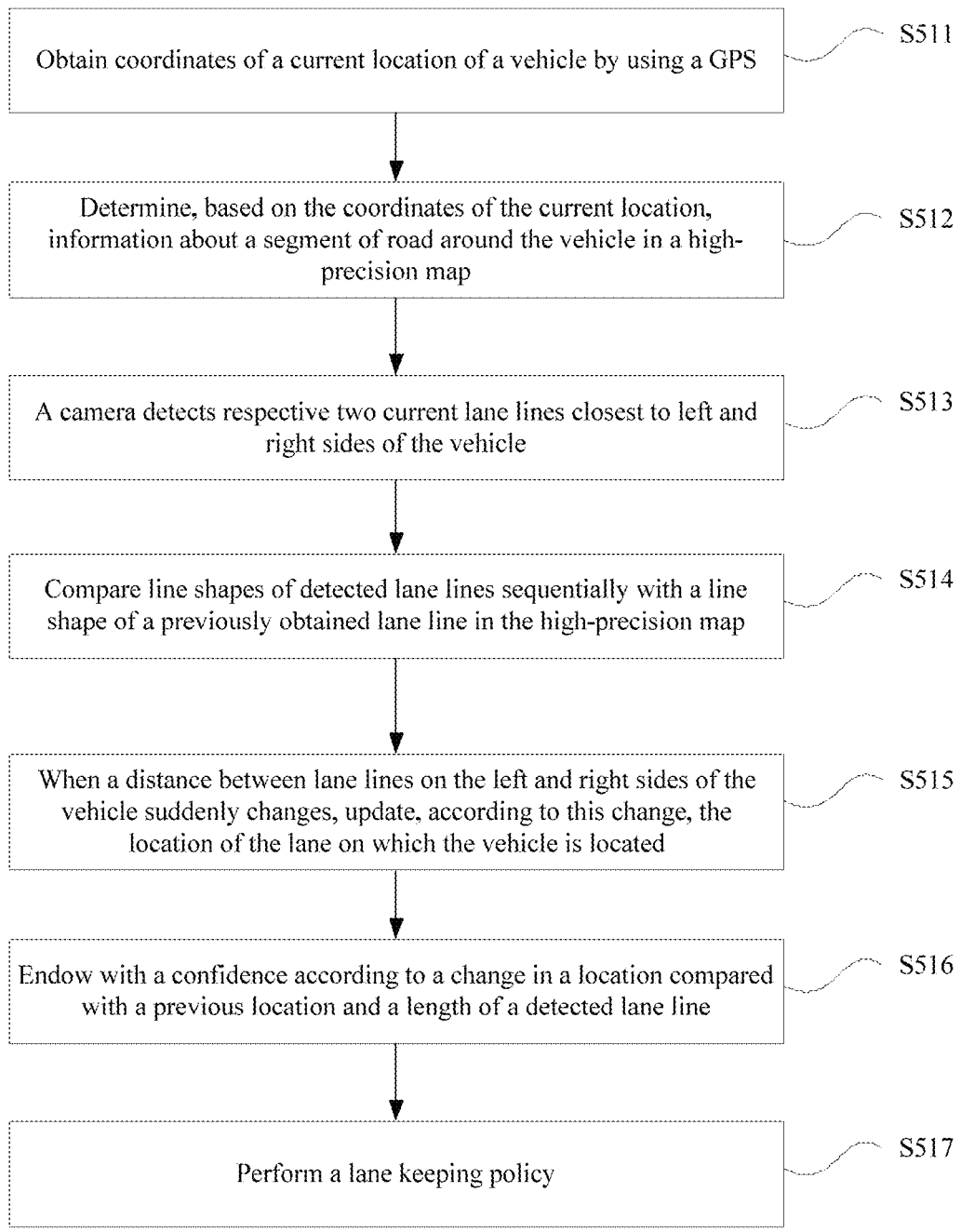
FIG. 5b is a flowchart of a lane determining method according to an embodiment of this application.

In the foregoing perspective projection image, it is not easy to distinguish a lane and a line-shaped interference object. Particularly, a lane of a dashed line type usually occurs in a form of a short line segment in the image. As a result, it is quite difficult to completely distinguish the lane and some line-shaped interference objects. After the orthographic projection processing, the lane of the dashed line type is mapped to a long line segment and is parallel to another lane, as shown in FIG. 5, and the line-shaped interference object is not parallel to the another lane or has an abnormal spacing relative to the another lane. In this way, it is quite easy to sort out the line-shaped interference object.

Through the foregoing image processing, each lane in the image and a lane feature (for example, a dashed line, a solid line, or a line width) of the each lane may be identified.

When the first lane information of the road surface is identified from the image information, one or more lanes (that is, first lanes) in the image may be identified, and the target lane is determined by using the one or more lanes. Preferably, to improve identification accuracy, all first lanes in the image may be identified. In this way, by comparing features of the plurality of lanes, a lane on which the vehicle is actually located may be determined more accurately.

In the technical solution provided in step S503, before feature matching is performed between the feature of the first lane and the feature of the at least one second lane in the map in which the road surface is located to determine the target lane of the vehicle in the map, the feature of the second lane may be obtained in the following manner: obtaining satellite positioning information of the vehicle, that is, obtaining satellite positioning information of the vehicle by using an in-vehicle satellite positioning system such as GPS/BDS/GLONASS, where limited by factors such as positioning accuracy and an environment, the satellite positioning information may relatively roughly indicate only a current location of the vehicle, and has relatively low precision, and therefore precise positioning of this application needs to be further performed; and obtaining, according to the satellite positioning information, a map of a road segment on which the road surface is located, where the map carries the at least one second lane and the feature of the at least one second lane.

The foregoing used map is a high-precision map, and the obtained map of the road segment on which the road surface is located may be a map for positioning a specific road segment of in-vehicle maps; or the map of the road segment on which the road surface is located may be obtained from high-precision maps in the Internet in an online obtaining manner.

The feature of the foregoing lane mainly includes a lane feature and a lane width, and when feature matching is performed between the feature of the first lane and the feature of the at least one second lane in the map in which the road surface is located to determine the target lane of the vehicle in the map, implementation may be performed in the following manner: searching the at least one second lane for a third lane whose lane feature and lane width match the lane feature and the lane width of the first lane, where the third lane is a lane corresponding to the first lane in the map, and for example, a third lane whose lane is a solid line and whose lane width is three meters is found from the second lane; and determining that a lane that is of the at least one second lane and that has a relative location relationship with the third lane is the target lane of the vehicle in the map, where the relative location relationship is a location relationship between the travelling lane of the vehicle on the road surface and the first lane, and for example, if the identified first lane is a lane on the left of the actual travelling lane of the vehicle, a lane on the left of the third lane in the map is the target lane.

In some embodiments, when there is one first lane, if only features of dashed and solid lines of a lane are considered, it may be difficult to find a unique result through matching. Therefore, features such as widths of dashed and solid lines may be further compared, so as to find a unique result through matching according to a feature of one lane.

In some embodiments, if there are a plurality of first lanes and a plurality of second lanes, and the plurality of first lanes includes the travelling lane of the vehicle on the road surface, when the at least one second lane is searched for a third lane whose lane feature and lane width match the lane feature and the lane width of the first lane, a plurality of fourth lanes whose quantity and feature match those of the plurality of first lanes is found in the plurality of second lanes.

That is, a plurality of first lanes is identified in the picture. Usually, the plurality of first lanes is lanes adjacent to each other, for example, three consecutive lanes, and the road width is actually five lanes. Then, matching may be performed between the three lanes and the five lanes. During matching, matching may be performed between the leftmost lane of the three lanes and the leftmost lane of the five lanes. After each time of matching is completed, matching continues to be performed by moving to the right by one lane, until three consecutive lanes whose features are completely consistent with features of the three lanes of the five lanes are found; and similarly, matching may alternatively start from the rightmost lane.

When the at least one second lane is searched for a third lane whose lane feature and lane width match the lane feature and the lane width of the first lane, whether a lane feature of any one of the at least one second lane is the same as a lane feature of the first lane may be judged, that is, whether the lane feature of each second lane is a solid line or a dashed line may be judged. The lane width may have a particular error. Therefore, when lane widths are compared, whether a difference between a lane width of any lane and a lane width of the first lane is less than a preset value may be judged. When it is judged that the lane feature of any one of the at least one second lane is the same as the lane feature of the first lane, and the difference between the lane width of any lane and the lane width of the first lane is less than the preset value, it is determined that the any lane is a third lane whose lane feature and lane width match the lane feature and the lane width of the first lane.

When it is determined that a lane that is of the at least one second lane and that has a relative location relationship with the third lane is the target lane of the vehicle in the map, the target lane is determined in the plurality of fourth lanes according to a location of the travelling lane of the vehicle on the road surface in the plurality of first lanes. For example, three first lanes are identified, the travelling lane is a lane in the middle of the three neighboring first lanes, after three consecutive lanes (that is, fourth lanes) that are of the foregoing five lanes and that match the three first lanes are determined, it may be determined that a lane in the middle of the three fourth lanes is the target lane.

It should be noted that, the foregoing target lane has a first confidence used to indicate determining accuracy, and after feature matching is performed between the feature of the first lane and the feature of the at least one second lane in the map in which the road surface is located to determine the target lane of the vehicle in the map, a fifth lane of the vehicle in the map obtained after a positioning sensor performs positioning on the vehicle is obtained, where the fifth lane has a second confidence used to indicate positioning accuracy; and a lane whose confidence satisfies a preset condition is selected from the target lane and the fifth lane to serve as an actual lane of the vehicle in the map, where the preset condition is a screening condition used to determine the actual lane of the vehicle in the map.

In an intelligent travelling system of the vehicle, reference may be made to positioning results of a plurality of sensors, the positioning results of the sensors may be fused together according to confidences, and a specific location of the vehicle is finally determined. For example, a lane whose confidence is relatively high is a final result. When a plurality of confidences is relatively close, if the plurality of confidences corresponds to the same lane, the lane may be used as a final identification result. If travelling of the vehicle is controlled according to the result, travelling safety of the vehicle may be improved.

In some embodiments, in the technical solution of this embodiment of this application, in addition to determining the travelling lane of the vehicle by using the foregoing method, a transverse location of the vehicle may be further positioned more specifically. After the first lane information of the road surface is identified from the image information, a distance between the vehicle and the lane of the first lane may be determined according to a location of the center line in the lane direction in the image information (that is, a relative location of the vehicle in the image) and a location of the lane of the first lane.

For example, if the camera is installed on the center location in front of the vehicle, the middle location in the collection width of the camera is the location of the vehicle. That is, for any collected image, the center location of the image in the transverse direction is the location of the vehicle. After the lane is identified a spacing between the vehicle and the lane may be calculated according to the center location, the lane, and the vehicle width, so as to control transverse movement of the vehicle. If the camera is not installed on the center location of the vehicle, because a distance between the camera and the center location of the vehicle is determined, implementation may be still performed by using the foregoing method.

The technical solution of this embodiment of this application may be applied to a positioning requirement of a self-driving automobile, and may be fused together with another vehicle positioning solution, to wholly improve positioning precision and stability of the vehicle, and may also be applied to lane keeping and lane change reminding of an Advanced Driver Assistance System (ADAS), to ensure security driving of the vehicle.

Embodiments of this application are described in detail below with reference to specific implementations:

For self-driving, in addition to a high-precision map, the industry generally considers that positioning, perception, decision-making, and control are four modules forming a self-driving automobile. Conventional self-positioning of a vehicle may be completed by using an ordinary GPS that usually has precision of about 1 to 10 m. Such precision cannot clearly distinguish whether the vehicle is on a main road or a side road, whether the vehicle is on a bridge or under a bridge, and still less a lane on which the vehicle is located. However, in autonomous driving, to reach relatively high positioning precision, in a common solution, autonomous driving is jointly completed by using high-precision differential "GPS+inertial measurement IMU+ground base station", but under a pressure of frequently generated hardware costs of hundreds of thousands of Chinese Yuan, it is quite difficult to complete a mass production requirement of autonomous driving vehicles currently. Compared with the previous technical solution, in the technical solution used in this embodiment of this application, costs are greatly controlled, and autonomous driving is jointly completed by using "high-precision map+ordinary GPS+camera".

The ordinary GPS is responsible for rough positioning, and has positioning precision that is usually about 1 to 10 m. Such positioning precision is insufficient to satisfy a requirement of a self-driving vehicle, but is sufficient to position, by using the ordinary GPS, data of a segment of road around the vehicle in the high-precision map, to serve as a reference for positioning the vehicle. Next, precise positioning is performed by using the lane detected by the camera, that is, the data of the segment of road is searched for an optimal matching location. The implementation is described in detail below with reference to steps shown in FIG. 5b, and specific positioning steps are as follows:

Step S511: Obtain coordinates of a current location of a vehicle by using a GPS.

Step S512: Determine, based on the coordinates of the current location, information about a segment of road around the vehicle in a high-precision map, where the information includes how many lanes there are in total, line shapes of the lanes, and widths of distances between each other.

Step S513: Judge the line shapes of the lanes according to respective two current lanes (four lanes in total if existing) closest to the left and right sides of the vehicle that are detected by a camera.

Usually, the camera collects a road surface image of the vehicle in real time, to obtain image information of the road surface. A client running on a terminal identifies the collected image information and judges lane information of lanes in an image, such as, lane features and lane widths.

Step S514: Compare the line shapes of the detected lanes sequentially with a line shape of a previously obtained lane in the high-precision map, so as to determine a location of a lane on which the vehicle is currently located.

Step S515: When the vehicle performs lane change, where a distance between lanes on the left and right sides of the vehicle suddenly changes, update, according to this change, the location of the lane on which the vehicle is located.

Step S516: Endow a transverse location of the vehicle currently positioned with a confidence according to a change in a location compared with a previous location and a length of a detected lane.

In some embodiments, the client running on the terminal device configured on the vehicle compares a current frame of the image information of the road surface of the vehicle collected by the camera with a previous frame. If a location of the vehicle in the current frame changes relative to a location of the vehicle in the previous frame, a confidence of the lane on which the vehicle is currently located is reduced; or lane types identified by the client from the image information of the road surface of the vehicle are endowed with different confidences, an identified lane whose lane type is a solid line is endowed with a high confidence, and an identified lane whose lane type is a dashed line is endowed with a low confidence. Step S517: When a confidence value is greater than a threshold, perform a lane keeping policy, thereby pausing lane comparison.

However, when a confidence is less than or equal to a threshold, the foregoing steps are repeated.

Figure 6A:
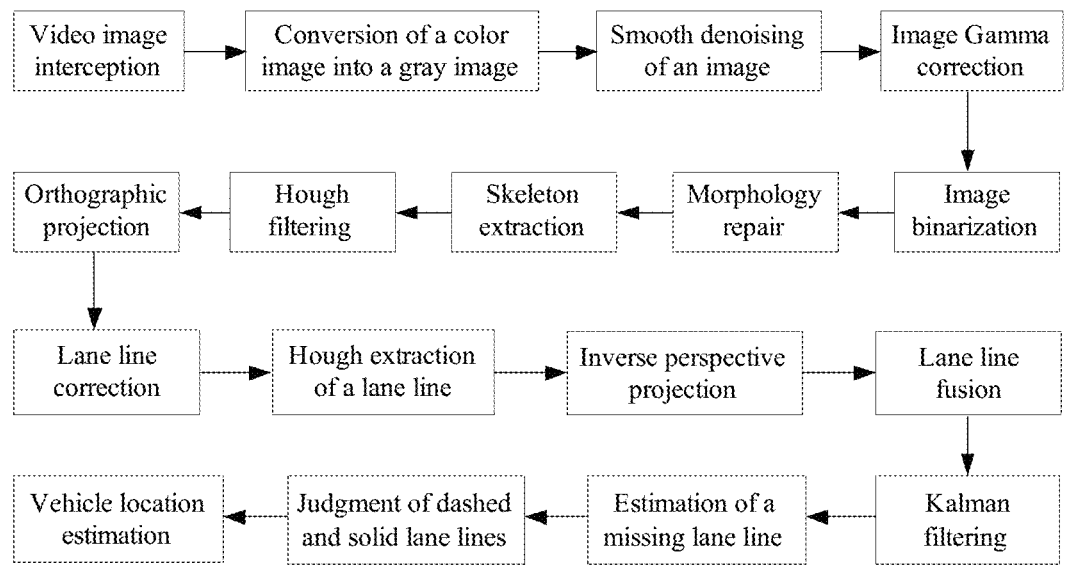
FIG. 6a is a schematic diagram of image processing according to an embodiment of this application.

In the foregoing step S513, image processing may be performed in a manner shown in FIG. 6a: video image interception, conversion of a color image into a gray image, smooth denoising of an image, image Gamma correction, image binarization processing, morphology repair, skeleton extraction, Hough filtering, orthographic projection, lane correction, Hough extraction of a lane, inverse perspective projection, lane fusion, Kalman filtering, estimation of a missing lane, judgment of dashed and solid lanes, and vehicle location estimation.

Figure 6B:
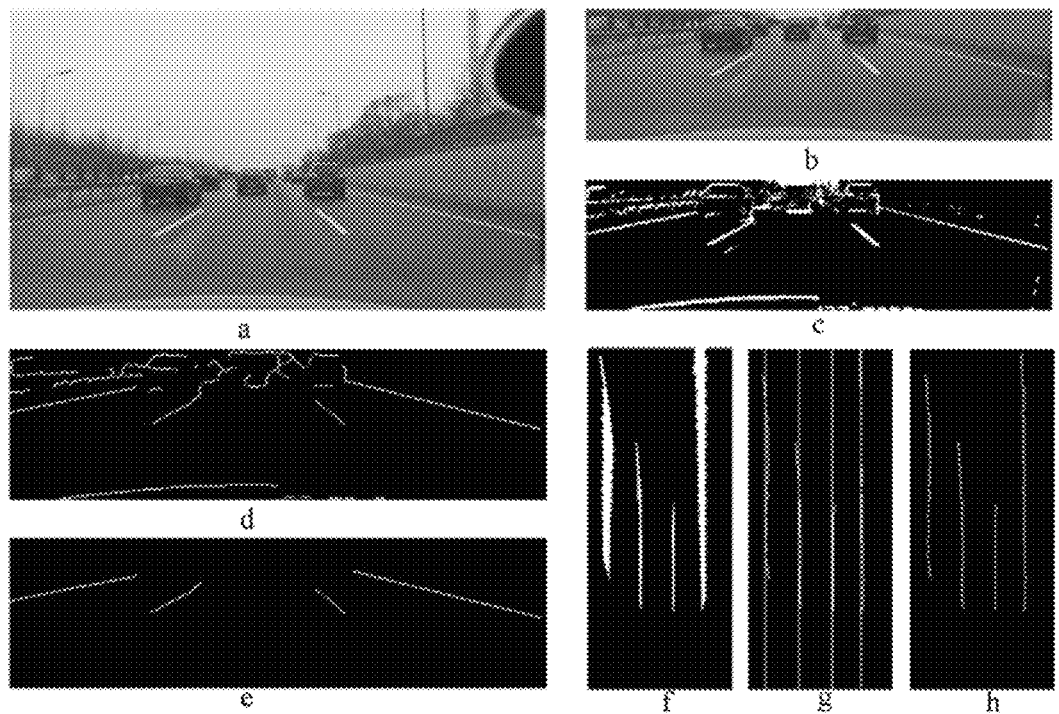
FIG. 6b is a schematic diagram of image processing according to an embodiment of this application.

A video image (a sub-picture a shown in FIG. 6b) not only includes an image of a road, but also includes images of scenes on two sides of the road and the sky. Therefore, a first step of detecting a lane is to intercept a video image (a sub-picture b shown in FIG. 6b), and retain only some areas of interest. Then, a color image is converted into a gray image, and then smooth denoising is performed on the image by using a bilateral filtering method. To improve adaptability to different ray images, before binarization is performed on the image, Gamma correction is first performed on the image. After image binarization (a sub-picture c shown in FIG. 6b), cavities are first repaired by using a morphology operation, a boundary is smoothed, and then a center line of lanes is extracted by using a skeleton extraction algorithm (a sub-picture d shown in FIG. 6b). On this basis, local filtering is performed by using a Hough conversion result, to remove interference and glitch. In this case, a perspective projection image (a sub-picture e shown in FIG. 6b) of the lanes is obtained, the perspective projection image is converted into an orthographic projection image (a sub-picture f shown in FIG. 6b) according to internal and external parameters of the camera, and then a front view of the lanes is obtained through morphology smoothing and skeleton extraction. In the front view, lane correction is first performed mainly for the purpose of processing a curved lane, then Hough conversion is performed to extract lanes (a sub-picture g shown in FIG. 6b), and then erroneously extracted lanes (a sub-picture h shown in FIG. 6b) are removed according to a constraint on a distance between the lanes. Finally, remaining lanes are inversely projected back into the perspective projection image, and are fused with lanes in the previous perspective projection image, to obtain a finally detected lane.

To output consecutive and stable lanes, Kalman filtering processing may be performed on each lane, and location estimation is performed on lanes that are transiently missing because of a reason such as blocking. Finally, whether each lane is dashed or solid is judged based on consecutiveness of lanes in consecutive frames of images and lengths of the lanes.

Figure 6C:
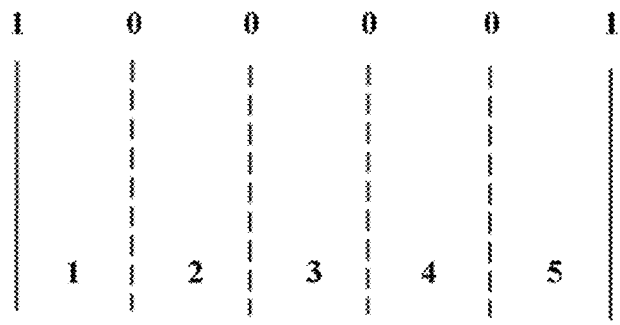
FIG. 6c is a schematic diagram of a lane according to an embodiment of this application.

In the embodiment provided in step S514, a deployment shape of lanes of a road is shown in FIG. 6c. The lanes are encoded by using 0 and 1. That is, when a lane is a dashed line, the lane is marked as 0, and when a lane is a solid line, the lane is marked as 1. Therefore, one road possessing five lanes (that is, lanes encoded as 1 to 5) may be indicated by using 100001, and these pieces of information of the road are provided by the high-precision map. Similarly, lanes detected by the camera are encoded in the same manner. For example, When a code of four detected lanes is 1000, where first two bits 10 represent two lanes on the left of the vehicle, last two bits 00 represent two lanes on the right of the vehicle, a current longitudinal location of the vehicle is within a second lane. Similarly, when a code of the four detected lanes is 0000, a current longitudinal location of the vehicle is within a third lane.

Positioning of a vehicle is one of key technologies for the vehicle to implement autonomous driving, and the vehicle needs to precisely perceive an environment around the vehicle by positioning a relative location of vehicle. An embodiment of this application relates to a transverse positioning method based on a high-precision map. The so-called transverse positioning is positioning in a direction perpendicular to a travelling direction of the vehicle, for example, positioning of a specific location of the vehicle relative to a lane when the vehicle is travelling on a lane. The method is used as an auxiliary means or a substitute for GPS/BDS positioning, and may effectively improve positioning precision of the vehicle when satellite signals are not good or cannot be obtained. After information such as high-precision data of lanes of a current road, including line shapes of the lanes (dashed line or solid line), a relative location between the lanes, and widths of the lanes are known, matching is performed between information about a plurality of lanes detected and identified in real time by using the camera installed on the front end of the vehicle and the known information, thereby positioning a lane of the road on which the vehicle is travelling, and a specific location of the vehicle relative to the lanes.

In this embodiment of this application, image processing is performed on the image information of the road surface to identify the first lane information, and then feature matching is performed between the feature of the first lane and the feature of the at least one second lane in the map in which the road surface is located to determine the target lane of the vehicle in the map. By using only existing devices of a current autonomous driving vehicle, the vehicle may be transversely positioned, to determine a lane on which the vehicle is actually located, and a technical problem of relatively high investment costs may be resolved when the vehicle is precisely positioned, thereby achieving technical effects of precisely positioning the vehicle and reducing the costs.

It should be noted that the foregoing method embodiments are expressed as a series of action combinations for the purpose of brief description, but a person of ordinary skill in the art should know that because some steps may be performed in other sequences or simultaneously according to the embodiments of this application, the embodiments of this application are not limited to a described action sequence. In addition, a person skilled in the art should also know that the embodiments described in this specification are all preferred embodiments; and therefore, an action and a module involved are not necessarily mandatory in the embodiments of this application.

Through the descriptions of the preceding embodiments, a person skilled in the art may understand that the methods according to the foregoing embodiments may be implemented by hardware only or by software and a necessary universal hardware platform. However, in most cases, using software and a necessary universal hardware platform are preferred. Based on such an understanding, the technical solutions of the embodiments of this application essentially, or the part contributing to the existing technology may be implemented in a form of a software product. The computer software product is stored in a storage medium (such as a ROM/RAM, a magnetic disk, or an optical disc) and includes several instructions for instructing a terminal device (which may be a mobile phone, a computer, a server, a network device, or the like) to perform the methods described in the embodiments of this application.

Figure 7:
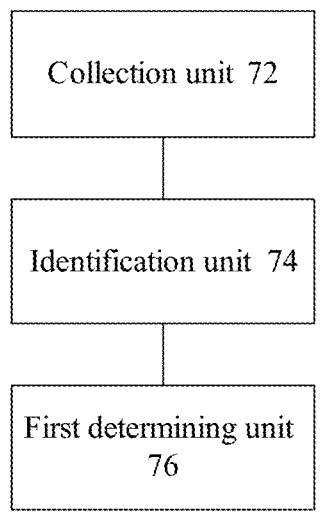
FIG. 7 is a schematic diagram of a lane determining apparatus according to an embodiment of this application.

This application further provides a lane determining apparatus for implementing the foregoing lane determining method. FIG. 7 is a schematic diagram of a lane determining apparatus according to an embodiment of this application. As shown in FIG. 7, the apparatus may include: one or more memories; and one or more processors. The one or more memories store one or more instruction modules configured to be executed by the one or more processors. The one or more instruction modules include: a collection unit 72, an identification unit 74, and a first determining unit 76.

The collection unit 72 is configured to collect an image of a road surface of a vehicle to obtain image information of the road surface.

The identification unit 74 is configured to identify first lane information of the road surface from the image information, where the first lane information includes a first lane and a feature of the first lane that are used to indicate a lane location of the vehicle on the road surface.

The first determining unit 76 is configured to perform feature matching between the feature of the first lane and a feature of at least one second lane in a map in which the road surface is located to determine a target lane of the vehicle in the map, where the at least one second lane and the feature of the at least one second lane are obtained from the map, and the at least one second lane includes the target lane.

It should be noted that, the collection unit 72 in this embodiment may be configured to perform step S511 in Embodiment 1 of this application, the identification unit 74 in this embodiment may be configured to perform step S512 in Embodiment 1 of this application, and the first determining unit 76 in this embodiment may be configured to perform step S513 in Embodiment 1 of this application.

It should be noted herein that, an example and an application scenario implemented by the foregoing modules are the same as those implemented by corresponding steps, but are not limited to content disclosed in Embodiment 1. It should be noted that, the foregoing modules may be run in a hardware environment shown in FIG. 1 as a part of the apparatus, and may be implemented through software, or may be implemented through hardware.

By using the foregoing modules, image processing is performed on the image information of the road surface to identify the first lane information, and then feature matching is performed between the feature of the first lane and the feature of the at least one second lane in the map in which the road surface is located to determine the target lane of the vehicle in the map. By using only existing devices of a current autonomous driving vehicle, the vehicle may be transversely positioned, to determine a lane on which the vehicle is actually located, and a technical problem of relatively high investment costs may be resolved when the vehicle is precisely positioned, thereby achieving technical effects of precisely positioning the vehicle and reducing the costs.

The foregoing road surface is a road surface on which the vehicle is currently travelling. The foregoing image information is an image having features of the road surface, for example, a color picture or a black and white picture, a color video or a black and white video, or a thermal imaging picture. The foregoing features include lane features, a lane width, and the like, and the lane features include at least a dashed line and a solid line. The foregoing vehicle may be an autonomous driving vehicle, various motor vehicles, and the like.

The first lane indicated by the foregoing first lane information may be a lane on which the vehicle is actually travelling, or may be any lane having a relative location relationship with a lane on which the vehicle is actually travelling.

The foregoing apparatus of this embodiment of this application is mainly used to transversely position a vehicle, and includes but is not limited to being used to transversely position an autonomous driving vehicle.

It should be noted that, the vehicle may step on a line (that is, a lane). Therefore, for convenience of description, in this embodiment of this application, when the vehicle steps on a line, as long as the width of the vehicle reaches 50% of that of a lane, it may be considered that the vehicle is located in the lane.

Since the automobile industry occurs, self-driving automobiles are always one of hot projects strongly challenged by automobile industry elites of nations. Because a self-driving automobile has an infinite potential in a dangerous operating environment or even in military application, investments from national governments are also attracted. However, because of problems of computer calculation capability and control system design, each current autonomous driving vehicle is limited to being used in a closed site or for a particular objective. With development of technologies, in recent years, numerous automobile corporations begin to happen to coincide with presentation of an autonomous driving technology, and even some automobile manufacturers predict that this technology may be popularized by 2020.

In some embodiments, the identification unit includes: a first processing module, configured to perform orthographic projection processing on the image information; an extraction module, configured to extract a feature from the image information subjected to the orthographic projection processing; and a second processing module, configured to perform inverse perspective projection processing on the feature-extracted image information.

Through the foregoing image processing, each lane in the image and a lane feature (for example, a dashed line, a solid line, or a line width) of the each lane may be identified.

Figure 8:
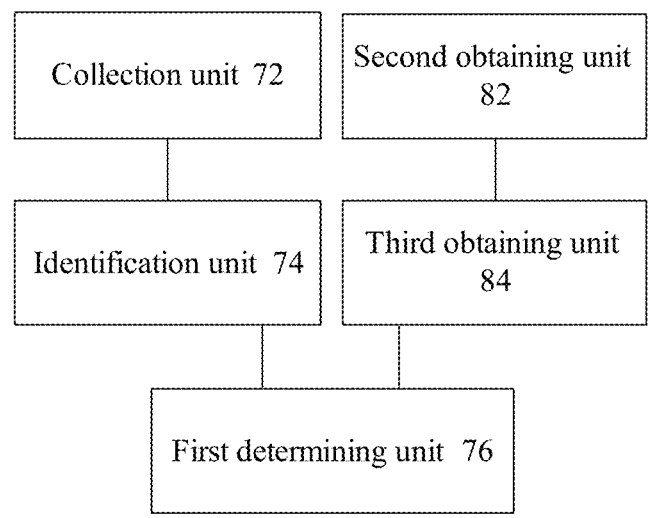
FIG. 8 is a schematic diagram of a target lane determining apparatus according to an embodiment of this application.

In some embodiments, as shown in FIG. 8, the apparatus of this embodiment of this application may further include: a second obtaining unit 82, configured to obtain satellite positioning information of the vehicle before feature matching is performed between the feature of the first lane and the feature of the at least one second lane in the map in which the road surface is located to determine the target lane of the vehicle in the map; and a third obtaining unit 84, configured to obtain, according to the satellite positioning information, a map of a road segment on which the road surface is located, where the map carries the at least one second lane and the feature of the at least one second lane.

The foregoing used map is a high-precision map, and the obtained map of the road segment on which the road surface is located may be a map for positioning a specific road segment of in-vehicle maps; or the map of the road segment on which the road surface is located may be obtained from high-precision maps in the Internet in an online obtaining manner.

In some embodiments, the feature of the foregoing lane mainly includes a lane feature and a lane width, and when the first determining unit performs feature matching between the feature of the first lane and the feature of the at least one second lane in the map in which the road surface is located to determine the target lane of the vehicle in the map, implementation may be performed by using the following modules: a search module, configured to search the at least one second lane for a third lane whose lane feature and lane width match the lane feature and the lane width of the first lane, where the third lane is a lane corresponding to the first lane in the map; and a determining module, configured to determine that a lane that is of the at least one second lane and that has a relative location relationship with the third lane is the target lane of the vehicle in the map, where the relative location relationship is a location relationship between the travelling lane of the vehicle on the road surface and the first lane.

In some embodiments, if there are a plurality of first lanes and a plurality of second lanes, and the plurality of first lanes includes the travelling lane of the vehicle on the road surface, when the search module searches the at least one second lane for a third lane whose lane feature and lane width match the lane feature and the lane width of the first lane, a plurality of fourth lanes whose quantity and feature match those of the plurality of first lanes is found in the plurality of second lanes.

In this case, the determining module determines the target lane in the plurality of fourth lanes according to a location of the travelling lane of the vehicle on the road surface in the plurality of first lanes. For example, three first lanes are identified, the travelling lane is a lane in the middle of the three neighboring first lanes, after three consecutive lanes (that is, fourth lanes) that are of the foregoing five lanes and that match the three first lanes are determined, it may be determined that a lane in the middle of the three fourth lanes is the target lane.

That is, a plurality of first lanes is identified in the picture. Usually, the plurality of first lanes is lanes adjacent to each other, for example, three consecutive lanes, and the road width is actually five lanes. Then, matching may be performed between the three lanes and the five lanes. During matching, matching may be performed between the leftmost lane of the three lanes and the leftmost lane of the five lanes. After each time of matching is completed, matching continues to be performed by moving to the right by one lane, until three consecutive lanes whose features are completely consistent with features of the three lanes of the five lanes are found; and similarly, matching may alternatively start from the rightmost lane.

Specifically, the foregoing search module includes: a first judgment sub-module, configured to judge whether a lane feature of any one of the at least one second lane is the same as a lane feature of the first lane; and a second judgment sub-module, configured to judge whether a difference between a lane width of any lane and a lane width of the first lane is less than a preset value. When it is judged that the lane feature of any one of the at least one second lane is the same as the lane feature of the first lane, and the difference between the lane width of any lane and the lane width of the first lane is less than the preset value, it is determined that the any lane is a third lane whose lane feature and lane width match the lane feature and the lane width of the first lane.

The foregoing target lane has a first confidence used to indicate determining accuracy, and the apparatus may further include: a first obtaining unit, configured to obtain, after feature matching is performed between the feature of the first lane and the feature of the at least one second lane in the map in which the road surface is located to determine the target lane of the vehicle in the map, a fifth lane of the vehicle in the map obtained after a positioning sensor performs positioning on the vehicle, where the fifth lane has a second confidence used to indicate positioning accuracy; and a selection unit, configured to select a lane whose confidence satisfies a preset condition from the target lane and the fifth lane to serve as an actual lane of the vehicle in the map.

In an intelligent travelling system of the vehicle, reference may be made to positioning results of a plurality of sensors, and a confidence that is relatively high is used as a final result. If travelling of the vehicle is controlled according to the result, travelling safety of the vehicle may be improved.

In some embodiments, in the technical solution of this embodiment of this application, in addition to determining the travelling lane of the vehicle by using the foregoing method, a transverse location of the vehicle may be further positioned more specifically. This may be specifically implemented according to a second determining unit of the apparatus, after the first lane information of the road surface is identified from the image information, the second determining unit determines a distance between the vehicle and the lane of the first lane according to a location of the center line in the lane direction in the image information and a location of the lane of the first lane.

Positioning of a vehicle is one of key technologies for the vehicle to implement autonomous driving, and the vehicle needs to precisely perceive an environment around the vehicle by positioning a relative location of vehicle. An embodiment of this application relates to a transverse positioning manner based on a high-precision map. The so-called transverse positioning is positioning in a direction perpendicular to a travelling direction of the vehicle, for example, positioning of a specific location of the vehicle relative to a lane when the vehicle is travelling on a lane. The manner is used as an auxiliary means or a substitute for GPS/BDS positioning, and may effectively improve positioning precision of the vehicle when satellite signals are not good or cannot be obtained. After information such as high-precision data of lanes of a current road, including line shapes of the lanes (dashed line or solid line), a relative location between the lanes, and widths of the lanes are known, matching is performed between information about a plurality of lanes detected and identified in real time by using the camera installed on the front end of the vehicle and the known information, thereby positioning a lane of the road on which the vehicle is travelling, and a specific location of the vehicle relative to the lanes.

It should be noted herein that, an example and an application scenario implemented by the foregoing modules are the same as those implemented by corresponding steps, but are not limited to content disclosed in Embodiment 1. It should be noted that, the foregoing modules may be run in the hardware environment shown in FIG. 1 as a part of the apparatus, and may be implemented by using software or may be implemented by using hardware, where the hardware environment includes a network environment.

This application further provides a server or terminal for implementing the foregoing lane determining method.

Figure 9:
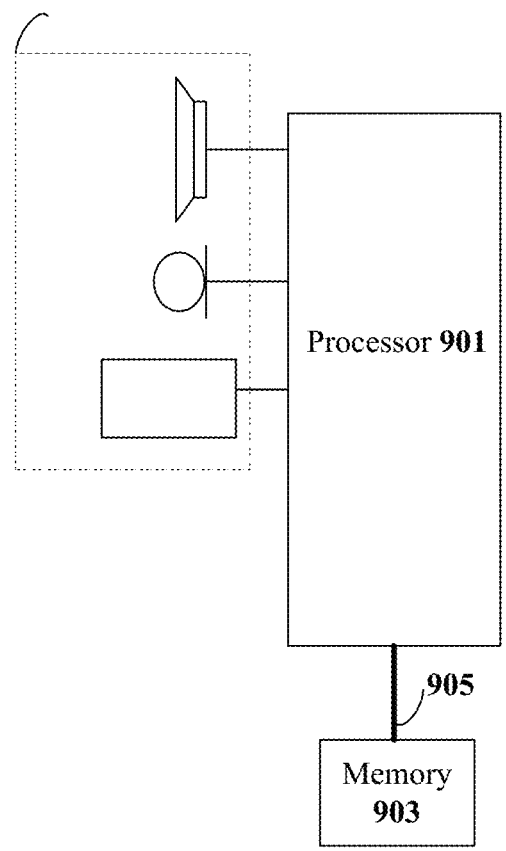
FIG. 9 is a structural block diagram of a terminal according to an embodiment of this application.

FIG. 9 is a structural block diagram of a terminal according to an embodiment of this application. As shown in FIG. 9, the terminal may include: one or more (only one is shown) processors 901, a memory 903, and a transmission apparatus 905 (for example, the sending apparatus in the foregoing embodiment). As shown in FIG. 9, the terminal may further include an input/output device 907.

The memory 903 may be configured to store a software program and a module, for example, a program instruction/module corresponding to a method and apparatus in an embodiment of this application, and the processor 901 performs various functional applications and data processing by running a software program and a module stored in the memory 903, that is, implementing the foregoing method. The memory 903 may include a high-speed random memory, and may also include a nonvolatile memory, for example, one or more magnetic storage devices, flash memories or other nonvolatile solid-state memories. In some embodiments, the memory 903 may further include memories remotely disposed relative to the processor 901, and these remote memories may be connected to the terminal through a network. Examples of the network include, but are not limited to, the Internet, an intranet, a local area network, a mobile communications network, and a combination thereof.

The transmission apparatus 905 is configured to receive or send data through a network, and may be further configured to transmit data between the processor and the memory. Specific examples of the foregoing network may include a wired network and a wireless network. In an embodiment, the transmission apparatus 905 includes a network interface controller (NIC) that may be connected to another network device and a router by using a network cable, thereby communicating with the Internet or a local area network. In an embodiment, the transmission apparatus 905 is a radio frequency (RF) module that is configured to communicate with the Internet in a wireless manner.

Specifically, the memory 903 is configured to store an application program.

The processor 901 may invoke, by using the transmission apparatus 905, the application program stored in the memory 903, so as to perform the following steps: collecting an image of a road surface of a vehicle to obtain image information of the road surface; identifying first lane information of the road surface from the image information, where the first lane information includes a first lane and a feature of the first lane that are used to indicate a lane location of the vehicle on the road surface; and performing feature matching between the feature of the first lane and a feature of at least one second lane in a map in which the road surface is located to determine a target lane of the vehicle in the map, where the at least one second lane and the feature of the at least one second lane are obtained from the map, and the at least one second lane includes the target lane.

The processor 901 is further configured to perform the following steps: searching the at least one second lane for a third lane whose lane feature and lane width match the lane feature and the lane width of the first lane, where the third lane is a lane corresponding to the first lane in the map; and determining that a lane that is of the at least one second lane and that has a relative location relationship with the third lane is the target lane of the vehicle in the map, where relative location relationship is a location relationship between the travelling lane of the vehicle on the road surface and the first lane.

By using this embodiment of this application, image processing is performed on the image information of the road surface to identify the first lane information, and then feature matching is performed between the feature of the first lane and the feature of the at least one second lane in the map in which the road surface is located to determine the target lane of the vehicle in the map. By using only existing devices of a current autonomous driving vehicle, the vehicle may be transversely positioned, to determine a lane on which the vehicle is actually located, and a technical problem of relatively high investment costs may be resolved when the vehicle is precisely positioned, thereby achieving technical effects of precisely positioning the vehicle and reducing the costs.

In some embodiments, for a corresponding specific example, refer to the examples described in the foregoing method embodiments, and details are not described herein again in this embodiment.

A person of ordinary skill in the art may understand that, the structure shown in FIG. 9 is only schematic. The terminal may be a terminal device such as a smartphone (such as an Android mobile phone or an iOS mobile phone), a tablet computer, a palmtop computer, a mobile Internet device (MID), or a PAD. FIG. 9 does not limit the structure of the foregoing electronic apparatus. For example, the terminal may further include more or less components (such as a network interface and a display apparatus) than those shown in FIG. 9, or has a configuration different from that shown in FIG. 9.

A person of ordinary skill in the art may understand that all or a part of the steps of the methods of the foregoing embodiments may be implemented by a program instructing relevant hardware of the terminal device. The program may be stored in a computer readable storage medium. The storage medium may be a flash disk, a read-only memory (ROM), a random access memory (RAM), a magnetic disk, or an optical disc.

This application further provides a storage medium. In some embodiments, in this embodiment, the foregoing storage medium may be configured to execute program code of a method.

In some embodiments, in this embodiment, the storage medium may be located on at least one network device of a plurality of network devices in the network shown in the foregoing embodiment.

In some embodiments, in this embodiment, the storage medium is configured to store program code used to perform the following steps:

S11: Collect an image of a road surface of a vehicle to obtain image information of the road surface.

S12: Identify first lane information of the road surface from the image information, where the first lane information includes a first lane and a feature of the first lane that are used to indicate a lane location of the vehicle on the road surface.

S13: Perform feature matching between the feature of the first lane and a feature of at least one second lane in a map in which the road surface is located to determine a target lane of the vehicle in the map, where the at least one second lane and the feature of the at least one second lane are obtained from the map, and the at least one second lane includes the target lane.

In some embodiments, the storage medium is further configured to store program code used to execute the following steps:

S21: Search the at least one second lane for a third lane whose lane feature and lane width match the lane feature and the lane width of the first lane, where the third lane is a lane corresponding to the first lane in the map.

S22: Determine that a lane that is of the at least one second lane and that has a relative location relationship with the third lane is the target lane of the vehicle in the map, where the relative location relationship is a location relationship between the travelling lane of the vehicle on the road surface and the first lane.

In some embodiments, for a corresponding specific example, refer to the examples described in the method embodiments, and details are not described herein again in this embodiment.

In some embodiments, in this embodiment, the foregoing storage medium may include but is not limited to: any medium that can store program code, such as a USB flash drive, a read-only memory (ROM), a random access memory (RAM), a removable hard disk, a magnetic disk, or an optical disc.

The sequence numbers of the foregoing embodiments of this application are merely for description purpose and do not indicate the preference of the embodiments.

When the integrated unit in the foregoing embodiment is implemented in a form of a software functional module and sold or used as an independent product, the integrated unit may be stored in the foregoing computer readable storage medium. Based on such an understanding, the technical solutions of the embodiments of this application essentially, or the part contributing to the existing technology, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the embodiments of this application.

In the foregoing embodiments of this application, descriptions of the embodiments have different emphases, and as for parts that are not described in detail in one embodiment, reference can be made to the relevant description of the other embodiments.

In the several embodiments provided in this application, it should be understood that the disclosed client may be implemented in other manners. The described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

The above descriptions are merely preferred embodiments of this application, and it should be noted that, a person of ordinary skill in the art may make various improvements and refinements without departing from the spirit of the embodiments of this application. All such modifications and refinements should also be intended to be covered by the embodiments of this application.

What is claimed is:

1. A lane determining method performed at a computing device having one or more processors and memory storing a plurality of programs to be executed by the one or more processors, the method comprising:
    obtaining image information of a road surface image collected by a vehicle;
    identifying first lane information of at least one first lane of the road surface from the image information, the first lane information comprising a location relationship between a travelling lane in which the vehicle is located and the at least one first lane, and a first lane feature of the at least one first lane that comprises one or more first lanes;
    obtaining a second lane feature of the road on which a geographic location of the vehicle is located from a map, wherein the second lane feature comprises a feature of one or more second lanes;
    performing feature matching between the first lane feature of the one or more first lanes and the second lane feature of the one or more second lanes; and
    determining a target lane of the vehicle in the map corresponding to the travelling lane in the map in accordance with the first lane feature, the second lane feature, the location relationship, and the feature matching result.

2. The method according to claim 1, wherein the determining the target lane corresponding to the travelling lane in the map by using the second lane feature, the first lane feature, and the location relationship comprises:
    comparing the first lane feature with the second lane feature;
    determining a third lane that corresponds to the first lane and that is of the second lane; and
    determining the target lane corresponding to the travelling lane in the map according to the third lane and the location relationship.

3. The method according to claim 2, wherein the first lane feature comprises a line type of one first lane, and the second lane feature comprises a line type of the one or more second lanes; and
    the determining a third lane that corresponds to the first lane and that is of the second lane comprises: using, as the third lane, a lane that is of the line type of the first lane and that is of the one or more second lanes.

4. The method according to claim 2, wherein the first lane feature comprises line types and an arrangement manner of a plurality of first lanes, and the second lane feature comprises line types and an arrangement manner of a plurality of second lanes; and
    the determining a third lane that corresponds to the first lane and that is of the second lane comprises: using, as the third lanes, a plurality of lanes that is of the line types and the arrangement manner of the plurality of first lanes and that is of the plurality of second lanes.

5. The method according to claim 4, wherein the determining a third lane that corresponds to the first lane and that is of the second lane comprises:
    organizing symbols corresponding to the line types of the first lanes in the arrangement manner of the first lanes according to a preset correspondence between a line type and a symbol, and generating a first symbol string indicating the first lane feature;
    organizing symbols corresponding to the line types of the second lanes in the arrangement manner of the second lanes according to the correspondence, and generating a second symbol string indicating the second lane feature; and
    comparing the first symbol string with the second symbol string, and using, as the third lanes, a plurality of lanes corresponding to a plurality of symbols in the second symbol string that is the same as those in the first symbol string.

6. The method according to claim 1, wherein the determining the target lane corresponding to the travelling lane in the map by using the second lane feature, the first lane feature, and the location relationship comprises:
determining a lane description of the travelling lane according to the first lane feature and the location relationship;
determining a lane description of each of the at least one second lane according to the feature of the second lane, wherein a lane description of a lane comprises a feature of one or more lanes and a location relationship between the one or more lanes and the lane;
comparing the lane description of the travelling lane with the lane description of each of the at least one second lane; and
determining, as the target lane, a second lane conforming to the lane description of the travelling lane.

7. The method according to claim 6, wherein the lane description of the travelling lane comprises a line type of one first lane and a location relationship between the first lane and the travelling lane;
the determining a lane description of each of the at least one second lane according to the feature of the second lane comprises: determining the lane description of the each second lane, wherein the lane description comprises a line type of one second lane and a location relationship between the second lane and the second lane; and
the determining, as the target lane, a second lane conforming to the lane description of the travelling lane comprises: determining, as the target lane, a lane of the at least one second lane, wherein a line type and a location relationship in a lane description of the lane are consistent with the line type and the location relationship in the lane description of the travelling lane.

8. The method according to claim 6, wherein the lane description of the travelling lane comprises line types of a plurality of first lanes, a first arrangement manner, and a location relationship between the plurality of first lanes and the travelling lane;
the determining a lane description of each of the at least one second lane according to the feature of the second lane comprises: determining the lane description of the each second lane, wherein the lane description comprises line types of a plurality of second lanes, a second arrangement manner, and a location relationship between the plurality of second lanes and the second lane; and
the determining, as the target lane, a second lane conforming to the lane description of the travelling lane comprises: determining, as the target lane, a lane of the at least one second lane, wherein a line type, an arrangement manner, and a location relationship in a lane description of the lane are consistent with the line type, the first arrangement manner, and the location relationship in the lane description of the travelling lane.

9. The method according to claim 8, wherein the determining, as the target lane, a lane of the at least one second lane, wherein a line type, an arrangement manner, and a location relationship in a lane description of the lane are consistent with the line type, the arrangement manner, and the location relationship in the lane description of the travelling lane comprises:
organizing, according to a preset correspondence between a line type and a location relationship and a symbol, symbols corresponding to first lanes in the lane description of the travelling lane in the first arrangement manner, and generating a first symbol string indicating the lane description of the travelling lane;
organizing, according to the correspondence, symbols corresponding to the plurality of second lanes in lane descriptions of second lanes in the second arrangement manner, and generating second symbol strings indicating the lane descriptions of the second lanes; and
comparing the first symbol string with each of the second symbol strings of the second lanes, and determining, as the target lane, a second lane corresponding to a second symbol string conforming to the first symbol string.

10. The method according to claim 1, wherein the identifying first lane information of the road surface from the image information comprises:
determining the travelling lane in the image information; and
determining the location relationship according to the determined travelling lane and the feature of the first lane.

11. The method according to claim 10, wherein the determining the travelling lane in the image information comprises one of the following:
determining, as the travelling lane, a lane on which a centerline of an image is located in the image information;
determining, as the travelling lane, a lane having a maximum lane width in the image information;
determining the travelling lane according to a shape of a lane in the image information; and
determining the travelling lane according to an angle between lanes in the image information.

12. The method according to claim 1, wherein the obtaining a second lane feature of a road on which a geographic location of the vehicle is located from the map comprises:
obtaining, according to a travelling direction of the vehicle, a second lane feature of a road in a direction consistent with the travelling direction from the map.

13. A computing device, comprising: one or more processors and memory, computer readable instructions stored in the memory, wherein the computer readable instructions, when executed by the one or more processors, cause the computing device to perform a plurality of operations including:
obtaining image information of a road surface image collected by a vehicle;
identifying first lane information of at least one first lane of the road surface from the image information, the first lane information comprising a location relationship between a travelling lane in which the vehicle is located and the at least one first lane, and a first lane feature of the at least one first lane that comprises one or more first lanes;
obtaining a second lane feature of the road on which a geographic location of the vehicle is located from a map, wherein the second lane feature comprises a feature of one or more second lanes;
performing feature matching between the first lane feature of the one or more first lanes and the second lane feature of the one or more second lanes; and
determining a target lane of the vehicle in the map corresponding to the travelling lane in the map in accordance with the first lane feature, the second lane feature, the location relationship, and the feature matching result.

14. The computing device according to claim 13, wherein the determining the target lane corresponding to the travelling lane in the map by using the second lane feature, the first lane feature, and the location relationship comprises:
- comparing the first lane feature with the second lane feature;
- determining a third lane that corresponds to the first lane and that is of the second lane; and
- determining the target lane corresponding to the travelling lane in the map according to the third lane and the location relationship.

15. The computing device according to claim 13, wherein the determining the target lane corresponding to the travelling lane in the map by using the second lane feature, the first lane feature, and the location relationship comprises:
- determining a lane description of the travelling lane according to the first lane feature and the location relationship;
- determining a lane description of each of the at least one second lane according to the feature of the second lane, wherein a lane description of a lane comprises a feature of one or more lanes and a location relationship between the one or more lanes and the lane;
- comparing the lane description of the travelling lane with the lane description of each of the at least one second lane; and
- determining, as the target lane, a second lane conforming to the lane description of the travelling lane.

16. The computing device according to claim 13, wherein the identifying first lane information of the road surface from the image information comprises:
- determining the travelling lane in the image information; and
- determining the location relationship according to the determined travelling lane and the feature of the first lane.

17. The computing device according to claim 13, wherein the obtaining a second lane feature of a road on which a geographic location of the vehicle is located from the map comprises:
- obtaining, according to a travelling direction of the vehicle, a second lane feature of a road in a direction consistent with the travelling direction from the map.

18. A non-transitory computer readable storage medium storing a plurality of machine readable instructions in connection with a computing device having one or more processors, wherein the plurality of machine readable instructions, when executed by the one or more processors, cause the computing device to perform a plurality of operations including:
- obtaining image information of a road surface image collected by a vehicle;
- identifying first lane information of at least one first lane of the road surface from the image information, the first lane information comprising a location relationship between a travelling lane in which the vehicle is located and the at least one first lane, and a first lane feature of the at least one first lane that comprises one or more first lanes;
- obtaining a second lane feature of the road on which a geographic location of the vehicle is located from a map, wherein the second lane feature comprises a feature of one or more second lanes;
- performing feature matching between the first lane feature of the one or more first lanes and the second lane feature of the one or more second lanes; and
- determining a target lane of the vehicle in the map corresponding to the travelling lane in the map in accordance with the first lane feature, the second lane feature, the location relationship, and the feature matching result.

* * * * *